United States Patent
McMahan et al.

(10) Patent No.: US 11,702,994 B2
(45) Date of Patent: Jul. 18, 2023

(54) PRESSURE RELIEF LATCH

(71) Applicant: Rohr, Inc., Chula Vista, CA (US)

(72) Inventors: Paul F. McMahan, College Station, TX (US); David L. Lipson, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 977 days.

(21) Appl. No.: 16/404,149

(22) Filed: May 6, 2019

(65) Prior Publication Data
US 2020/0355124 A1 Nov. 12, 2020

(51) Int. Cl.
*B64D 29/00* (2006.01)
*F02C 9/18* (2006.01)
*F01D 21/14* (2006.01)
*F01D 25/24* (2006.01)
*F02C 3/04* (2006.01)

(52) U.S. Cl.
CPC ............ *F02C 9/18* (2013.01); *B64D 29/00* (2013.01); *F01D 21/14* (2013.01); *F01D 25/24* (2013.01); *F02C 3/04* (2013.01); *F05D 2220/32* (2013.01); *F05D 2240/14* (2013.01); *F05D 2260/30* (2013.01); *F05D 2260/52* (2013.01)

(58) Field of Classification Search
None
See application file for complete search history.

(56) References Cited

U.S. PATENT DOCUMENTS

| | | | |
|---|---|---|---|
| 2,833,578 A * | 5/1958 | William | E05C 19/024 292/216 |
| 3,347,580 A * | 10/1967 | Whiting | E05B 65/0811 292/242 |
| 3,571,977 A | 3/1971 | Abeel | |
| 3,659,886 A * | 5/1972 | Andrews | E05C 19/024 292/78 |
| 5,765,883 A | 6/1998 | Dessenberger | |
| 6,513,841 B1 | 2/2003 | Jackson | |
| 7,210,711 B2 * | 5/2007 | Dirnberger | E05C 3/24 292/68 |
| 8,439,308 B2 * | 5/2013 | Armstrong | G05B 17/02 244/129.4 |

(Continued)

OTHER PUBLICATIONS

EP search report for EP19212443.6 dated Jun. 29, 2020.

*Primary Examiner* — Todd E Manahan
*Assistant Examiner* — Sean V Meiller
(74) *Attorney, Agent, or Firm* — Getz Balich LLC

(57) ABSTRACT

A pressure relief latch includes a housing configured to be mounted to a pressure relief door. A bolt is coupled to the housing about a first axis and is rotatable about the first axis between a first bolt position and a second bolt position. The bolt includes a bearing centered about a second axis. The bearing is configured to rotate about the second axis. A spring assembly includes a first assembly end mounted to the bearing and a second assembly end in rotational communication with the housing about a third axis. The spring assembly is rotatable about the second and third axes and further includes a spring extending between the first and second assembly ends. The bolt is configured to permit movement of the pressure relief door from the closed position to the open position as the bolt rotates from the first bolt position to the second bolt position.

15 Claims, 6 Drawing Sheets

(56) References Cited

U.S. PATENT DOCUMENTS

| | | | |
|---|---|---|---|
| 8,740,147 B2* | 6/2014 | Defrance | B64D 29/06 |
| | | | 244/129.4 |
| 9,267,315 B2* | 2/2016 | Lee | E05B 65/0053 |
| 2011/0240137 A1* | 10/2011 | Vauchel | B64D 29/00 |
| | | | 137/15.2 |
| 2012/0125010 A1 | 5/2012 | Armstrong | |
| 2017/0037667 A1 | 2/2017 | Do | |
| 2017/0058582 A1 | 3/2017 | Do | |
| 2017/0122015 A1* | 5/2017 | Do | E05B 63/0056 |

* cited by examiner

PRESSURE RELIEF LATCH

BACKGROUND

1. Technical Field

This disclosure relates generally to pressure relief systems, and more particularly to pressure relief latches associated with pressure relief doors.

2. Background Information

A gas turbine engine includes one or more cowlings (e.g., a core cowling, fan cowling, thrust reverser cowling, etc.) which form exterior housings of one or more portions of the engine. The cowling may define an exterior boundary of one or more compartments of the engine. Compartment structural materials and/or components may be subject hazardous conditions in the event of an increase in compartment pressure beyond compartment design considerations. Such over-pressure events can result from a number of circumstances. For example, the cowling may enclose other engine accessories, such as pressurized air (e.g., compressor bleed air) lines or ducts, which may be disposed within the compartments. The fluids contained within these lines may have high temperatures and pressures which, if exposed to structural materials or components within the compartment, as a result of a rupture in the lines (i.e., a "burst duct event"), may cause damage to the structural materials or components. Additionally, over-pressurization events may occur as a result of scooping, for example, as a result of a failed leading-edge latch for a fan cowling, or as a result of any other condition having a substantial impact on compartment pressure.

In order to address the above-described concerns, pressure relief doors have been used to vent high-temperature and/or high-pressure fluids from the compartments during over-pressure events. Pressure relief doors may include a pressure relief latch configured to permit the pressure relief door to deploy (i.e., operate to relieve pressure within the compartment) within a predetermined allowable pressure range. Conventional pressure relief latches may require one or more components to rotate directly about a roller pin and/or may require physical contact between the roller pin and a rotatable bolt. Friction between the roller pin and the other components of the conventional pressure relief latch can result in galling which may not be addressable by reintroducing lubrication to the contacting surfaces. As a result, the conventional pressure relief latches may fail to deploy within the allowable pressure range presenting an increased risk of damage to engine components within the compartment. Accordingly, what is needed is a pressure relief latch which addresses one or more of the above-described concerns.

SUMMARY

According to an embodiment of the present disclosure, a pressure relief latch includes a housing configured to be mounted to a pressure relief door movable between a closed position and an open position. A bolt is coupled to the housing about a first axis and is rotatable about the first axis between a first bolt position and a second bolt position. The bolt includes a bearing centered about a second axis. The bearing is configured to rotate about the second axis. A spring assembly includes a first assembly end mounted to the bearing and a second assembly end in rotational communication with the housing about a third axis. The spring assembly is rotatable about the second and third axes and further includes a spring extending between the first and second assembly ends. The bolt is configured to permit movement of the pressure relief door from the closed position to the open position as the bolt rotates from the first bolt position to the second bolt position.

In the alternative or additionally thereto, in the foregoing embodiment, the bolt includes a first bolt end configured to engage a structure when the bolt is in the first bolt position and wherein the pressure relief door is configured to move relative to the structure between the closed position and the open position.

In the alternative or additionally thereto, in the foregoing embodiment, the bolt includes a second bolt end configured to be positioned within a radially extending slot of the housing when the bolt is in the first bolt position.

In the alternative or additionally thereto, in the foregoing embodiment, the first, second, and third axes are substantially parallel.

In the alternative or additionally thereto, in the foregoing embodiment, the bolt includes a first wall and a second wall spaced from the first wall. The bearing is disposed between the first wall and the second wall.

In the alternative or additionally thereto, in the foregoing embodiment, a distance between the second and third axes is greater when the bolt is in the second bolt position than when the bolt is in the first bolt position.

In the alternative or additionally thereto, in the foregoing embodiment, the bolt is configured to rotate about the second axis with respect to the spring assembly.

In the alternative or additionally thereto, in the foregoing embodiment, the spring assembly includes a slider rod extending from the first assembly end through a center of the spring. The slider rod includes a longitudinally extending channel through which the third axis passes.

In the alternative or additionally thereto, in the foregoing embodiment, the slider rod is configured to translate along a spring axis extending in a direction between the second and third axes and the slider rod translates with respect to the third axis.

In the alternative or additionally thereto, in the foregoing embodiment, the bolt is configured to compress the spring along a first portion of a rotation from the first bolt position to the second bolt position.

In the alternative or additionally thereto, in the foregoing embodiment, the bolt is configured to rotate in a first direction about the second axis and the spring assembly is configured to rotate in a second direction about the second axis, opposite the first direction, as the bolt rotates from the first bolt position to the second bolt position.

In the alternative or additionally thereto, in the foregoing embodiment, the second axis is configured to be spaced away from a plane extending between the first and third axes, opposite the plane from the pressure relief door, when the bolt is in the first bolt position.

According to another embodiment of the present disclosure, a compartment includes a compartment wall and a pressure relief door in rotatable communication with the compartment wall and rotatable between an open position and a closed position. The pressure relief door and the compartment wall define at least a portion of an exterior of the compartment when the pressure relief door is in the closed position. A pressure relief latch includes a housing mounted to an interior surface of the pressure relief door. A bolt is coupled to the housing about a first axis and is rotatable about the first axis between a first bolt position and a second bolt position. The bolt includes a bearing centered about a second axis. The bearing is configured to rotate about the second axis. A spring assembly includes a first assembly end mounted to the bearing and a second assembly end in rotational communication with the housing about a third axis. The spring assembly is rotatable about the second and third axes and further includes a spring extending between the first and second assembly ends. Rotation of the bolt from the first bolt position to the second bolt position permits rotation of the pressure relief door from the closed position to the open position.

In the alternative or additionally thereto, in the foregoing embodiment, the bolt includes a first bolt end configured to engage the compartment wall when the bolt is in the first bolt position and the pressure relief door is configured to rotate relative to the compartment wall between the closed position and the open position.

In the alternative or additionally thereto, in the foregoing embodiment, the pressure relief latch is configured to secure the pressure relief door in the closed position while an internal pressure of the compartment is less than a predetermined pressure.

In the alternative or additionally thereto, in the foregoing embodiment, the bolt is configured to rotate from the first bolt position to the second bolt position in response to the internal pressure of the compartment greater than the predetermined pressure.

In the alternative or additionally thereto, in the foregoing embodiment, the bolt is configured to compress the spring along a first portion of a rotation of the bolt from the first bolt position to the second bolt position and the spring is configured to expand during a second portion of the rotation of the bolt from the first bolt position to the second bolt position.

In the alternative or additionally thereto, in the foregoing embodiment, the bolt is configured to rotate about the second axis with respect to the spring assembly.

In the alternative or additionally thereto, in the foregoing embodiment, the bolt is configured to rotate in a first direction about the second axis and the spring assembly is configured to rotate in a second direction about the second axis, opposite the first direction, as the bolt rotates from the first bolt position to the second bolt position.

According to another embodiment of the present disclosure, a gas turbine engine includes a nacelle, an engine core disposed within the nacelle, and a core cowling enclosing the engine core. The nacelle and the core cowling define a bypass flow path therebetween. The core cowling includes a pressure relief door in rotational communication with the core cowling. The pressure relief door is rotatable between a closed position and an open position an exterior surface of the pressure relief door forms a substantially continuous exterior surface with the core cowling when the pressure relief door is in the closed position. A pressure relief latch includes a housing mounted to an interior surface of the pressure relief door. A bolt is coupled to the housing about a first axis and is rotatable about the first axis between a first bolt position and a second bolt position. The bolt includes a bearing centered about a second axis. The bearing is configured to rotate about the second axis. A spring assembly includes a first assembly end mounted to the bearing and a second assembly end in rotational communication with the housing about a third axis. The spring assembly is rotatable about the second and third axes and further includes a spring extending between the first and second assembly ends. Rotation of the bolt from the first bolt position to the second bolt position permits rotation of the pressure relief door from the closed position to the open position.

The present disclosure, and all its aspects, embodiments and advantages associated therewith will become more readily apparent in view of the detailed description provided below, including the accompanying drawings.

DETAILED DESCRIPTION

Figure 1:
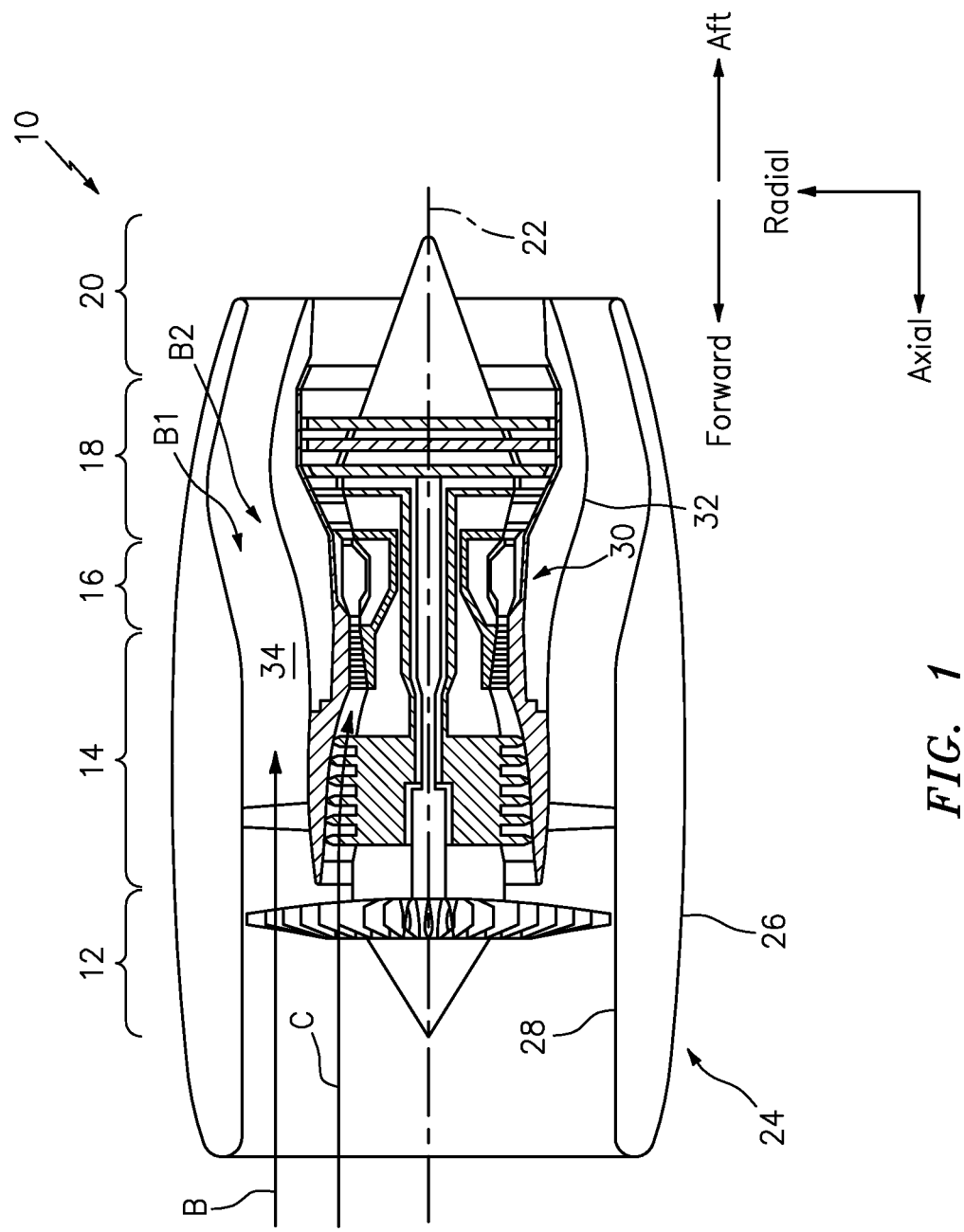
FIG. 1 illustrates a side, cross-sectional view of a gas turbine engine.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings.

Referring to FIG. 1 a gas turbine engine 10 generally includes a fan section 12, a compressor section 14, a combustor section 16, a turbine section 18, and an exhaust section 19 disposed about an axial centerline 22. The gas turbine engine 10 further includes a nacelle 24 defining an exterior housing of the gas turbine engine 10 about the axial centerline 22. The nacelle 24 includes an outer barrel 26 defining a radially outermost surface of the nacelle 24 and an inner barrel 28 defining a radially innermost surface of the nacelle 24. An engine core 30 generally includes all or part of the fan section 12, compressor section 14, combustor section 16, turbine section 18, and exhaust section 20. A cowling 32 defines an exterior housing of the engine core 30 about the axial centerline 22. While the present disclosure is discussed with respect to a core cowling, it should be understood that embodiments of the present disclosure are also applicable to any other gas turbine engine cowlings, for example, fan cowlings, thrust reverser cowlings, etc.

The inner barrel 28 and the cowling 32 may generally define an annular bypass duct 34 therebetween. The fan section 12 drives air along a bypass flow path B through the gas turbine engine 10. At least a portion of the bypass flow path B may pass through the bypass duct 34. The compressor section 14 drives air along a core flow path C, separate from the bypass flow path B, for compression and communication into the combustor section 16 and then expansion through the turbine section 18.

Figure 2:
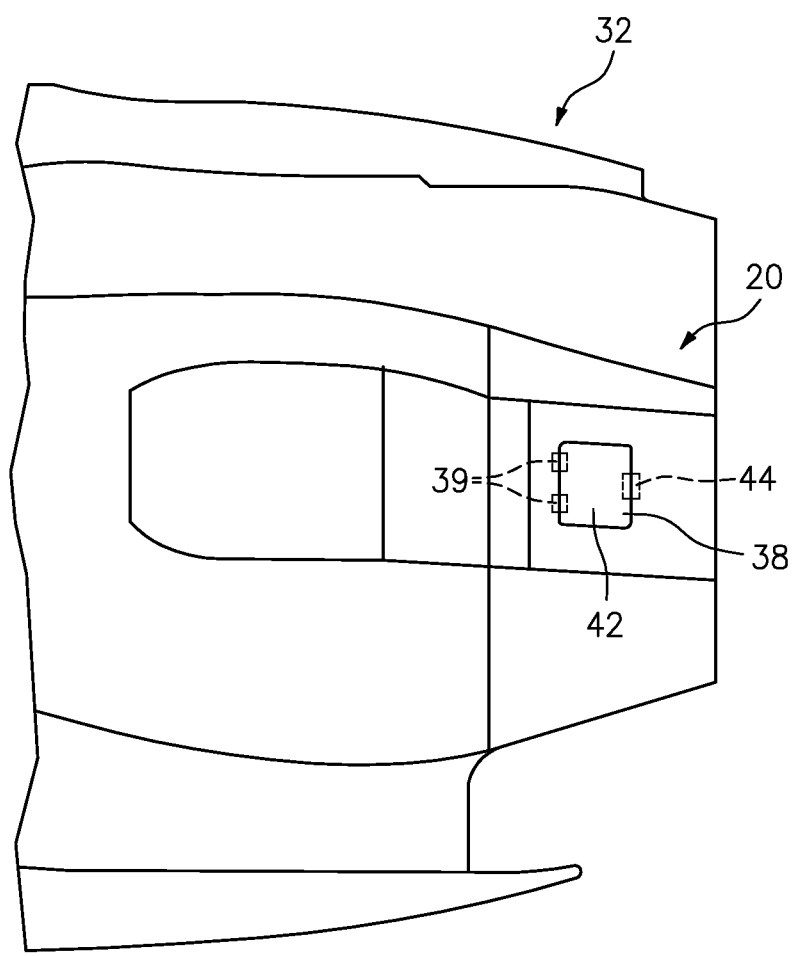
FIG. 2 illustrates an exterior side view of an engine cowling.

Referring to FIG. 2, the cowling 32 may include one or more pressure relief doors 38 configured to release high-pressure and high-temperature gases from a compartment 36 (see FIG. 4) of the engine core 30 (see FIG. 1), for example, during a burst duct event. The compartment 36 may be defined, at least in part, by the cowling 32 and the pressure relief door 38. In some embodiments, a plurality of pressure relief doors 38 may be circumferentially spaced about the cowling 32. The pressure relief door 38 may be disposed in the cowling 32 proximate the exhaust section 20 of the gas turbine engine 10. The pressure relief door 38 may be movable relative to the cowling 32 between a closed position and an open position. For example, the pressure relief door 38 may be in rotatable communication with the cowling 32 via one or more hinges 39. Accordingly, as will be discussed in further detail, the pressure relief door 38 may be configured to rotate from the closed position to the open position in response to an elevated internal pressure in the compartment 36 at or above a predetermined pressure. A pressure relief latch 44 may be provided to permit the pressure relief door 38 to rotate from the closed position to the open position when the internal pressure in the compartment 36 is at or above the predetermined pressure.

As used herein, the "closed position" will be used to refer to the pressure relief door 38 in a position such that an exterior surface 42 of the pressure relief door 38 forms a substantially continuous exterior surface with the cowling 32 (i.e., the pressure relief door 38 is in a normal position for operation of the gas turbine engine 10, however, minor gaps or radial misalignment within design tolerances may exist between the pressure relief door 38 and the cowling 32). As used herein, the "open position" will be used to refer to the pressure relief door 38 in a position other than the closed position (i.e., the pressure relief door 38 is partially open, fully open, etc.). As previously discussed, aspects of the present disclose may be directed to pressure relief within gas turbine engine nacelles, core compartments, thrust reversers, and other suitable portions of a gas turbine engine wherein pressure relief is desirable. While the present disclosure is discussed with respect to aircraft gas turbine engines, it should be understood that the present disclosure is not limited to use in gas turbine engines or aircraft and may be applied to any other suitable vehicle, industrial application, or environment where compartment pressure relief is desirable.

Figure 3:
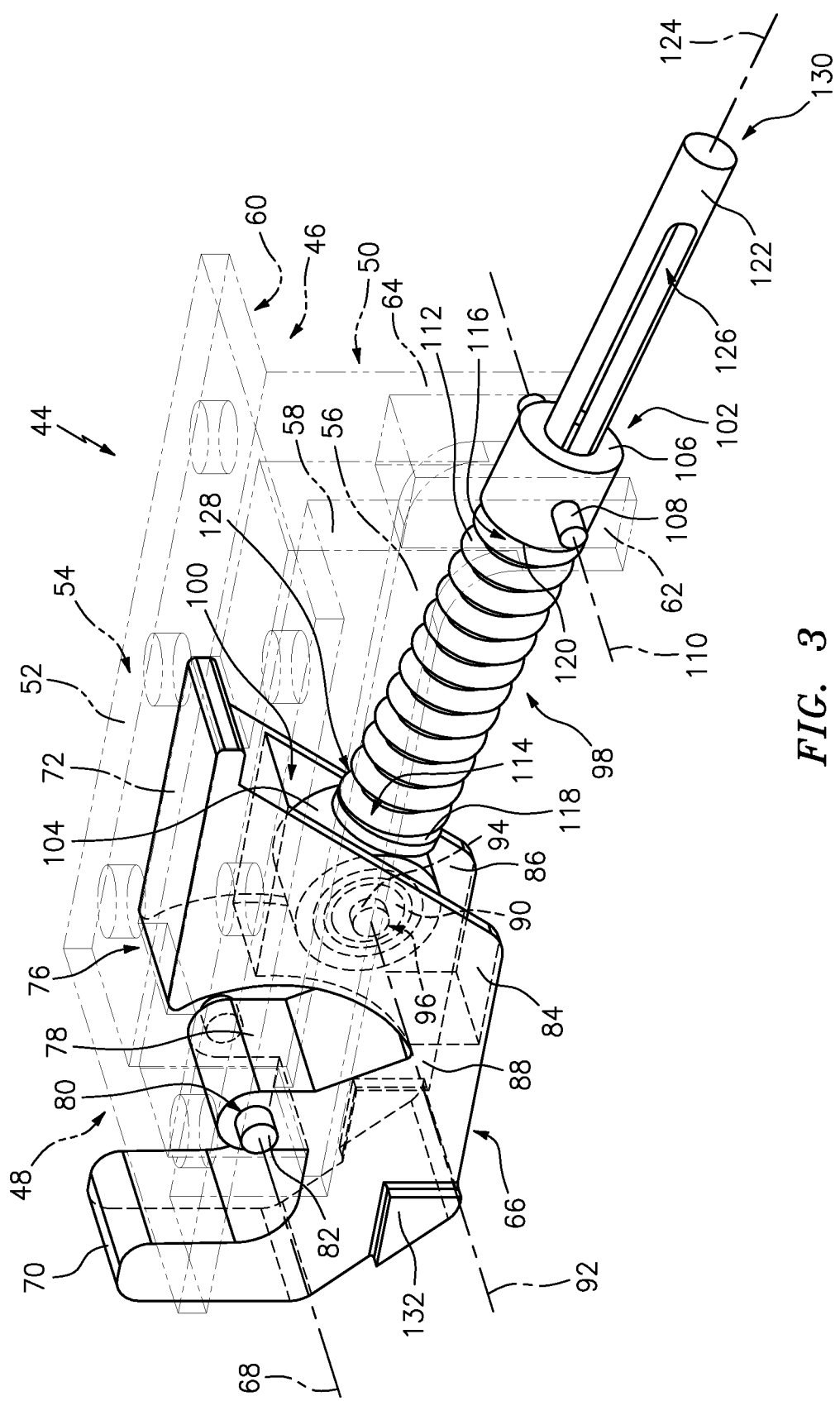
FIG. 3 illustrates a perspective cut-away view of an exemplary pressure relief latch in a latched condition.
Figure 4:
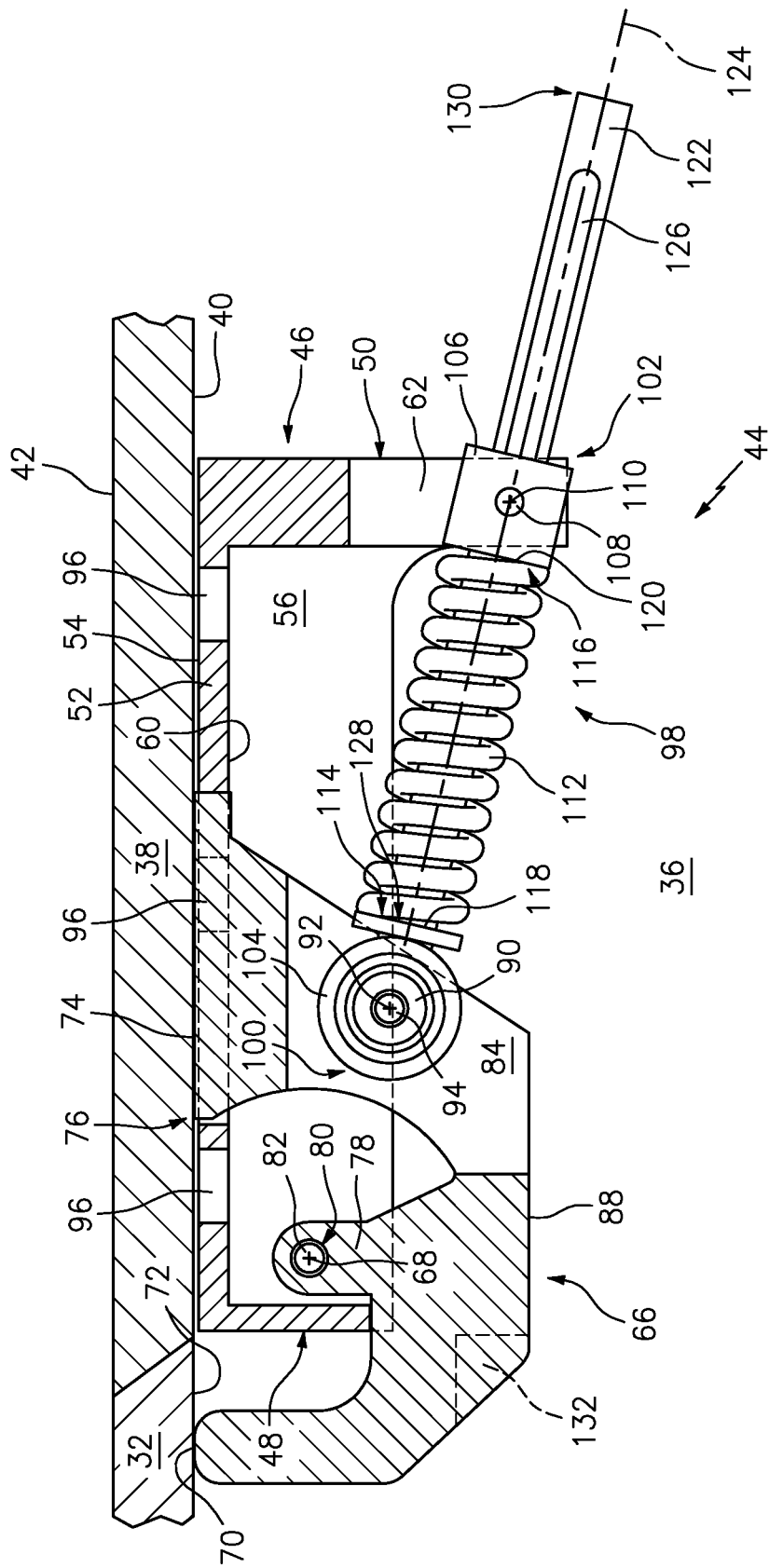
FIG. 4 illustrates a side cut-away view of the pressure relief latch of FIG. 3.
Figure 5:
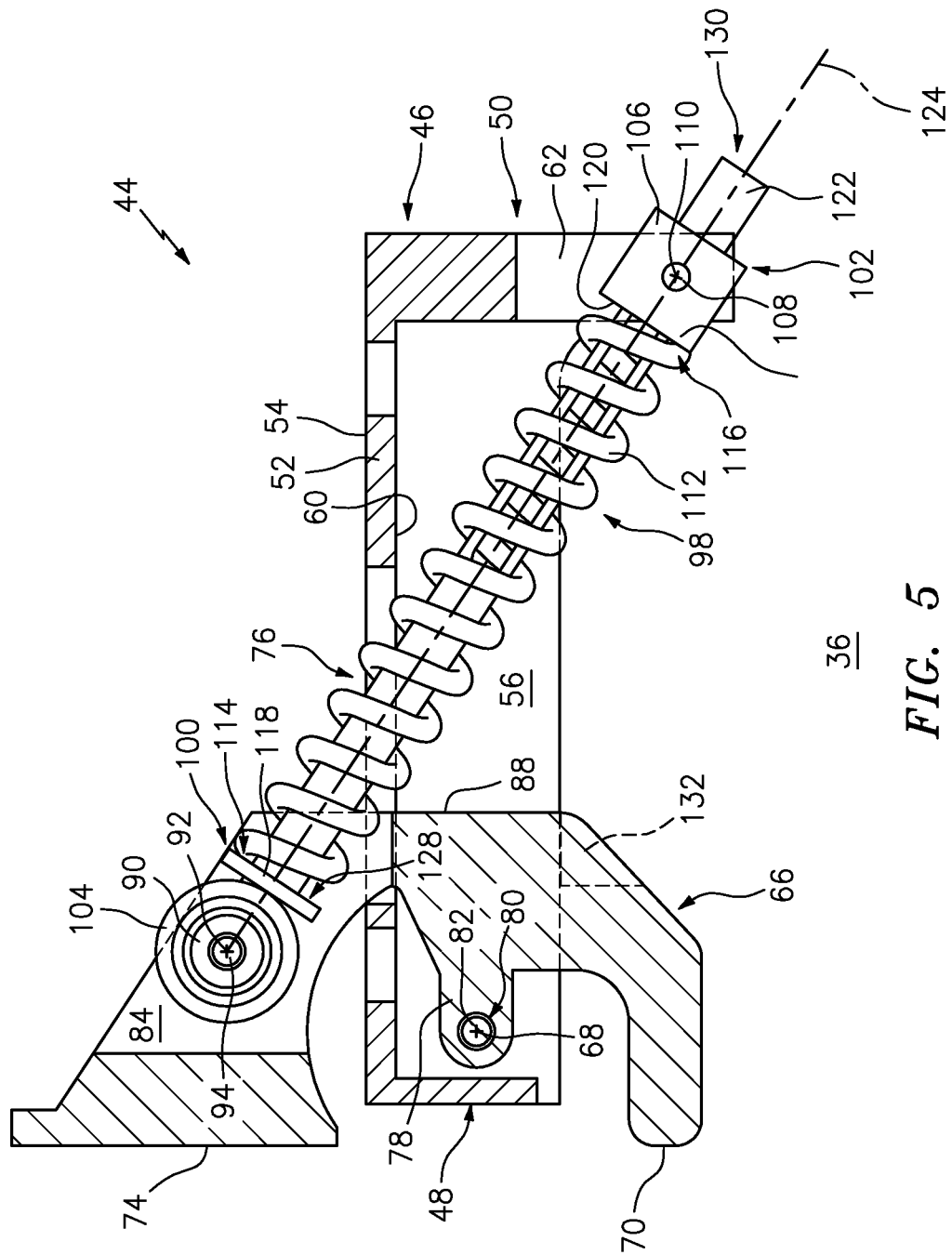
FIG. 5 illustrates a side cut-away view of the pressure relief latch of FIG. 3. in an unlatched condition.

Referring to FIGS. 3-5, the pressure relief latch 44 according to the present disclosure is illustrated. The pressure relief latch 44 is configured to secure the pressure relief door 38 in a closed condition during normal gas turbine engine 10 operation (i.e., when pressure relief is not needed). The pressure relief latch 44 is configured to secure the pressure relief door 38 to a structure of the compartment 36, for example, a compartment wall or the cowling 32. The pressure relief latch 44 may be mounted to an interior surface 40 of the pressure relief door 38 proximate the cowling 32. In some embodiments, the pressure relief door 38 and the cowling 32 may have a seal therebetween (i.e., a seal fixed to one of the pressure relief door 38 or the cowling 32) when the pressure relief door 38 is in the closed position.

The pressure relief latch 44 includes a housing 46 having a first axial end 48 and a second axial end 50 opposite the first axial end 48. The housing 46 includes a base 52 extending between the first axial end 48 and the second axial end 50. The base 52 includes a mating surface 54 configured to mate with the interior surface 40 of the pressure relief door 38. The housing 46 includes first and second radial walls 56, 58 spaced from one another and extending radially from an interior surface 60 of the base 52, opposite the mating surface 54, between the first and second axial ends 48, 50. Each of the first and second radial walls 56, 58 include respective first and second projecting portions 62, 64 proximate the second axial end 50 and extending a greater radial distance from the base 52 with respect to the remainder of the respective first and second radial walls 56, 58. The base 52 includes one or more apertures 96 extending radially through a thickness of the base 52. The one or more apertures 96 are configured to receive a respective one or more fasteners for mounting the pressure relief latch 44 to the pressure relief door 38.

The pressure relief latch 44 includes a bolt 66 rotatably mounted to the housing 46 about a first axis 68 and disposed between the first and second radial walls 56, 58. The bolt 66 is rotatable between a first bolt position (see, e.g., FIG. 4), corresponding to a latched condition of the pressure relief latch 44, and a second bolt position (see, e.g., FIG. 5) corresponding to an unlatched condition of the pressure relief latch 44. The bolt 66 includes a first bolt end 70 which may be disposed proximate or in communication with an interior surface 72 of the cowling 32 when the bolt 66 is in the first bolt position. The bolt 66 includes a second bolt end 74 which may be disposed within a slot 76 extending radially through the base 52 of the housing 46 when the bolt 66 is in the first bolt position.

The bolt 66 further includes a projecting portion 78 extending from the bolt 66 between the first and second bolt ends 70, 74. The projecting portion 78 include an aperture 80 extending through a thickness of the projecting portion 78 along the first axis 68. The housing 48 include a corresponding pin 82 extending between the first and second radial walls 56, 58 along the first axis 68. The pin 82 is configured to pass through the aperture 80 thereby rotatably mounting the bolt 66 to the housing 48 about the first axis 68.

The bolt 66 includes first and second walls 84, 86 spaced from one another and extending from the second bolt end 74. The first and second walls 84, 86 define at least a portion of a bolt body 88 of the bolt 66 between the first and second bolt ends 70, 74. The bolt 66 further includes a bearing 90 rotatably mounted to the bolt 66 about a second axis 92 between the first and second walls 84, 86. For example, the bearing 90 may be rotatably mounted to a pin 94 extending between the first and second walls 84, 86 along the second axis 92. In some embodiments, the bolt 66 may include one or more open stops 132 extending in a tangential direction from the bolt body 88. The one or more open stops 132 may be configured to contact the interior surface 60 of the base 52 as the bolt 66 reaches the second bolt position when rotating from the first bolt position to the second bolt position. Thus, the one or more open stops 132 may stop the rotation of the bolt 66 thereby preventing over-rotation of the bolt 66 past the second bolt position (see FIG. 5).

The pressure relief latch 44 includes a spring assembly 98 having a first assembly end 100 and a second assembly end 102. The first assembly end 100 includes a first mounting portion 104 mounted to the bearing 90. Accordingly, the bolt 66 may be configured to rotate about the second axis 92 with respect to the spring assembly 98. In some embodiments, the first mounting portion 104 may be an annular portion forming a perimeter about the bearing 90 with respect to the second axis 92. Thus, the spring assembly 98 is configured to rotate about the second axis 92 proximate the first assembly end 100. The second assembly end 102 includes a second mounting portion 106 mounted to the first and second projecting portions 62, 64 of the respective first and second radial walls 56, 58. The second mounting portion 106 may include a pin 108 extending through and outward from the second mounting portion 106 along a third axis 110. The pin 108 may be retained within corresponding apertures 112 extending through respective thicknesses of the first and second projecting portions 62, 64 along the third axis 110.

Thus, the spring assembly 98 may also be configured to rotate about the third axis 110 proximate the second assembly end 102.

The spring assembly 98 includes a spring 112 having a first spring end 114 in communication with the first mounting portion 104 and a second spring end 116 in communication with the second mounting portion 106. The first and second mounting portions 104, 106 may include respective first and second stops 118, 120 configured to form an interface with the respective first and second spring ends 114, 116. Thus, the spring 112 may be retained in a compressed state between the first and second stops 118, 120.

The spring assembly 98 may include a slider rod 122 extending from the first mounting portion 104 through a center of the spring 112 and through an aperture extending through a thickness of the second mounting portion 106 along a spring axis 124 in a direction between the first assembly end 100 and the second assembly end 102. Accordingly, the slider rod 122 may be configured to translate along the spring axis 124 with respect to the third axis 110. In some embodiments, the slider rod 122 may include a longitudinally extending channel 126, extending a portion of a distance between a first rod end 128 and a second rod end 130, through which the third axis 110 passes. Thus, the pin 108 may extend through the channel 126 while the slider rod 122 remains free to translate along the spring axis 124. In some other embodiments, the pin 108 may be a pair of opposing pins extending from the second mounting portion 106 along the third axis 110. In this case, the slider rod 122 may not require the channel 126.

In some embodiments, the bolt 66 may include a plurality of bearings 90 rotatably mounted to the bolt 66 about the second axis 92. Additionally, in some embodiments, the pressure relief latch 44 may include a plurality of spring assemblies 98. For example, each spring assembly 98 of the plurality of spring assemblies 98 may include a first mounting portion 104 mounted to a respective bearing 90 of the plurality of bearings 90. Each spring assembly 98 may also include a second mounting portion 106 mounted to the housing 46 and configured to rotate about the third axis 110.

Figure 4A:
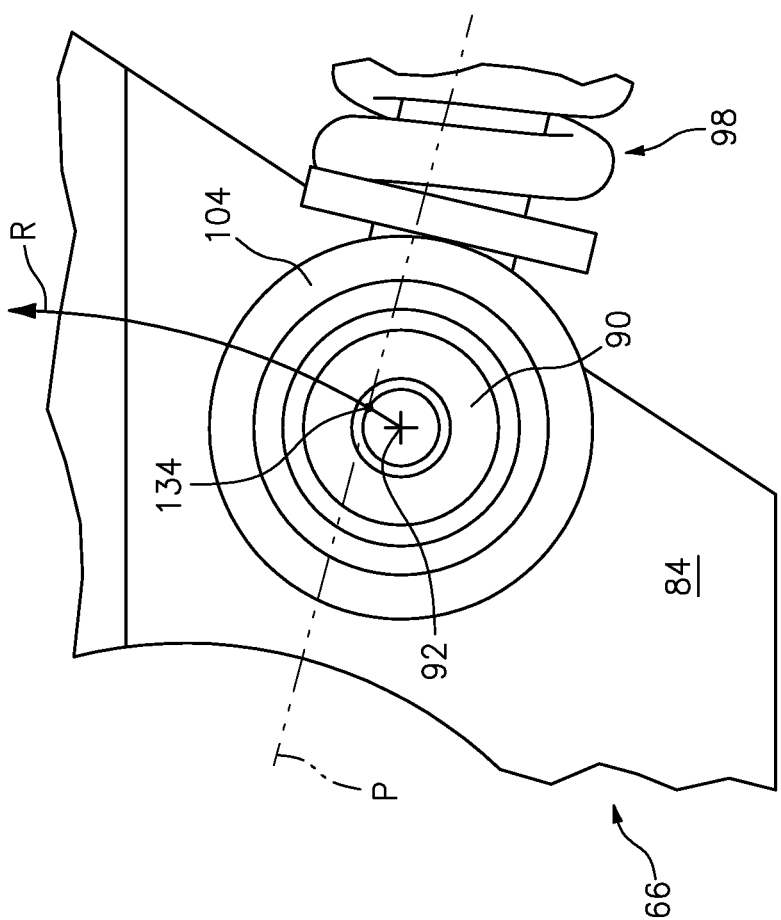
FIG. 4A illustrates another side cut-away view of the pressure relief latch of FIG. 3.

In some embodiments, two or more of the first, second, and third axes 68, 92, 110 may be substantially parallel. As used herein, the term "substantially" with regard to an angular relationship refers to the noted angular relationship +/−5 degrees. In some embodiments, a distance between the second and third axes 92, 110 may be greater when the bolt 66 is in the second bolt position than when the bolt 66 is in the first bolt position. In some embodiments, the second axis 92 may be configured to be spaced away from a geometric plane P (see FIG. 4A illustrating the second axis 92 with respect to the plane P with the bolt 66 in the first bolt position) along which the first and third axes 68, 110 extend, opposite the plane P from the pressure relief door 38, when the bolt 66 is in the first bolt position. In said embodiment, as the bolt 66 rotates from the first bolt position to the second bolt position, the second axis 92 may pass through the plane P so as to be disposed between the plane P and the pressure relief door 38.

The pressure relief latch 44 is configured to secure the pressure relief door 38 in the closed position while an internal pressure of the compartment 36 is less than a predetermined pressure (i.e., a selected compartment pressure at which the pressure relief door 38 is configured to rotate from the closed position to the open position in order to prevent or reduce damage to components with the compartment 36). The predetermined pressure may be a predetermined pressure range within which the pressure relief door 38 is configured to rotate from the closed position to the open position (e.g., a selected compartment pressure +/−5%, 10%, 15%, etc.).

As previously discussed, the compartment 36, enclosed by, for example, the cowling 32, may be subject to an over-pressurization event as a result of one or more conditions internal or external to the gas turbine engine 10. For example, the compartment 36 may include one or more ducts or lines containing high-temperature and/or high-pressure fluids. An equipment failure leading to a rupture from one of the ducts into the compartment 36 may rapidly fill the compartment 36 with the high-temperature and/or high-pressure fluid. Additionally, over-pressurization events may occur as a result of air scooping, for example, as a result of a failed leading-edge latch for a fan cowling, or as a result of any other condition having a substantial impact on compartment pressure. In order to prevent damage to components within the compartment 36, the pressure relief door 38 is configured to deploy from the closed position to the open position in order to direct the high-temperature and/or high-pressure fluid from the compartment 36. Accordingly, the pressure relief latch 44 is configured to permit movement of the pressure relief door 36 from the closed position to the open position in response to an internal pressure of the compartment 36 greater than the predetermined pressure.

In operation, the first bolt end 70 is configured to engage the cowling 32 when the bolt 66 is in the first bolt position. An internal pressure of the compartment 36 may apply a force to the interior surface 40 of the pressure relief door 38 thereby biasing the first bolt end 70 against the cowling 32 thereby applying a pressure against the first bolt end 70 with the cowling 32. If the internal pressure of the compartment 36 is sufficiently high, the pressure applied to the first bolt end 70 may cause the bolt 66 to begin rotating about the second axis 92. During a first portion of the rotation of the bolt 66 from the first bolt position to the second bolt position, the rotation of the bolt 66 may cause a compression of the spring 112 between the first and second mounting portions 104, 106. Thus, the compression of the spring 112 may produce a force in opposition to the rotation of the bolt 66 from the first bolt position to the second bolt position potentially preventing further rotation of the bolt 66 depending on the internal pressure of the compartment 36.

At a critical position 134 in the rotation of the bolt 66 from the first bolt position to the second bolt position, further rotation of the bolt 66 from the first bolt position to the second bolt position may not apply further compression to the spring 112 (see, e.g., FIG. 4A). In this second portion of the rotation of the bolt 66 from the first bolt position to the second bolt position, the spring 112 may expand thereby applying a force to assist rotation of the bolt 66 from the first bolt position to the second bolt position. In some embodiments, the critical position 134 may substantially correspond to a position of the bolt 66 wherein the second axis 92 is disposed along the plane P along which the first and third axes 68, 110 extend. An internal pressure of the compartment at or above the predetermined pressure may permit the rotation of the bolt 66 to transition from the first portion to the second portion of rotation from the first bolt position to the second bolt position.

As the bolt 66 continues to rotate from the first bolt position to the second bolt position, the first bolt end 70 may no longer contact the cowling 32, thereby allowing the internal pressure of the compartment 36 to push the pressure relief door 38 from the closed position to the open position. Accordingly, the pressure relief door 38 in the open position may permit the high-temperature and/or high-pressure fluid within the compartment 36 to escape the compartment 36. In some embodiments, the high-temperature and/or high-pressure fluid may be directed by the pressure relief door 38 into the bypass flow path B proximate the exhaust section 20 of the gas turbine engine 10. Aspects of the present disclose may substantially eliminate friction between the bolt 66 and the spring assembly 98 thereby preventing or reducing galling between pressure relief latch 44 component surfaces in rotational communication.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A pressure relief latch comprising: a housing having a first axial end and a second axial end, the housing comprising a base, a first radial wall, and a second radial wall, the base extending between the first axial end and the second axial end, the base comprising a mating surface and an interior surface opposite the mating surface, the first radial wall and the second radial wall extending radially from the interior surface, the first radial wall spaced from the second radial wall, the housing further comprising a radially extending slot extending through the base from the interior surface to the mating surface; a bolt coupled to the first radial wall and the second radial wall of the housing about a first axis and rotatable about the first axis between a first bolt position and a second bolt position, the bolt comprising a bearing centered about a second axis, the bearing configured to rotate about the second axis, the bolt further comprising a second bolt end configured to be positioned within the radially extending slot of the housing when the bolt is in the first bolt position and positioned outside the radially extending slot of the housing when the bolt is in the second bolt position, wherein the interior surface faces the bearing with the bolt in the first bolt position and the mating surface faces the bearing with the bolt in the second bolt position; and a spring assembly comprising a first assembly end mounted to the bearing and a second assembly end in rotational communication with the housing about a third axis, the spring assembly rotatable about the second and third axes and further comprising a spring extending between the first and second assembly ends.

2. The pressure relief latch of claim 1, wherein the bolt comprises a first bolt end disposed axially outside the base with the bolt in the first bolt position.

3. The pressure relief latch of claim 1, wherein the first, second, and third axes are substantially parallel.

4. The pressure relief latch of claim 1, wherein the bearing is disposed between the first radial wall and the second radial wall.

5. The pressure relief latch of claim 1, wherein a distance between the second and third axes is greater when the bolt is in the second bolt position than when the bolt is in the first bolt position.

6. The pressure relief latch of claim 1, wherein the bolt and the spring assembly are configured to rotate about the second axis.

7. The pressure relief latch of claim 1, wherein the spring assembly comprises a slider rod extending from the first assembly end through a center of the spring, the slider rod comprising a longitudinally extending channel through which the third axis passes.

8. The pressure relief latch of claim 7, wherein the slider rod is configured to translate along a spring axis extending in a direction between the second and third axes and wherein the slider rod translates with respect to the third axis.

9. The pressure relief latch of claim 1, wherein the bolt is configured to compress the spring along a first portion of a rotation from the first bolt position to the second bolt position.

10. The pressure relief latch of claim 1, wherein the bolt is configured to rotate in a first direction about the second axis and the spring assembly is configured to rotate in a second direction about the second axis, opposite the first direction, as the bolt rotates from the first bolt position to the second bolt position.

11. The pressure relief latch of claim 1, wherein the second axis is configured to be spaced away from a plane extending between the first and third axes, opposite the plane from the base, when the bolt is in the first bolt position.

12. The pressure relief latch of claim 1, wherein the housing further comprises one or more fastener apertures extending through the base from the interior surface to the mating surface.

13. The pressure relief latch of claim 1, wherein the bolt includes a first wall and a second wall spaced from the first wall, the bearing rotatable mounted to the bolt between the first wall and the second wall.

14. The pressure relief latch of claim 13, wherein the bearing is rotatably mounted to a pin extending between the first wall and the second wall along the second axis.

15. The pressure relief latch of claim 1, wherein the bolt is configured to pass through the slot as the bolt rotates between the first bolt position and the second bolt position.

* * * * *